United States Patent
Dimitriadis et al.

(10) Patent No.: US 10,249,292 B2
(45) Date of Patent: Apr. 2, 2019

(54) USING LONG SHORT-TERM MEMORY RECURRENT NEURAL NETWORK FOR SPEAKER DIARIZATION SEGMENTATION

(71) Applicant: International Business Machines Corporation, Armonk, NY (US)

(72) Inventors: Dimitrios B. Dimitriadis, White Plains, NY (US); David C. Haws, New York, NY (US); Michael Picheny, White Plains, NY (US); George Saon, Stamford, CT (US); Samuel Thomas, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 15/379,010

(22) Filed: Dec. 14, 2016

(65) Prior Publication Data
US 2018/0166066 A1    Jun. 14, 2018

(51) Int. Cl.
*G10L 21/00* (2013.01)
*G10L 15/00* (2013.01)
(Continued)

(52) U.S. Cl.
CPC .............. *G10L 15/04* (2013.01); *G10L 17/18* (2013.01); *G10L 25/30* (2013.01); *G10L 25/78* (2013.01)

(58) Field of Classification Search
None
See application file for complete search history.

(56) References Cited

U.S. PATENT DOCUMENTS 8,793,132 B2 * 7/2014 Itoh .................... G10L 15/04
                                                704/248
9,263,036 B1    2/2016 Graves
(Continued)

FOREIGN PATENT DOCUMENTS

CN        105118502       7/2015

OTHER PUBLICATIONS

Haws, David, et al., "On the Importance of Event Detection for ASR," 2016 IEEE International Conference on Acoustics, Speech and Signal Processing (ICASSP), pp. 5705-5709, IEEE, 2016. 5 pages.
(Continued)

*Primary Examiner* — Satwant K Singh
(74) *Attorney, Agent, or Firm* — Feb Cabrasawan

(57) ABSTRACT

Speaker diarization is performed on audio data including speech by a first speaker, speech by a second speaker, and silence. The speaker diarization includes segmenting the audio data using a long short-term memory (LSTM) recurrent neural network (RNN) to identify change points of the audio data that divide the audio data into segments. The speaker diarization includes assigning a label selected from a group of labels to each segment of the audio data using the LSTM RNN. The group of labels comprising includes labels corresponding to the first speaker, the second speaker, and the silence. Each change point is a transition from one of the first speaker, the second speaker, and the silence to a different one of the first speaker, the second speaker, and the silence. Speech recognition can be performed on the segments that each correspond to one of the first speaker and the second speaker.

20 Claims, 11 Drawing Sheets

(51) Int. Cl.
*G10L 15/04* (2013.01)
*G10L 25/30* (2013.01)
*G10L 25/78* (2013.01)
*G10L 17/18* (2013.01)

(56) References Cited

U.S. PATENT DOCUMENTS

| | | | | |
|---|---|---|---|---|
| 9,508,340 B2* | 11/2016 | Parada San Martin | ................... | G06F 1/3203 |
| 9,754,584 B2* | 9/2017 | Parada San Martin | ................... | G06F 1/3203 |
| 9,786,270 B2* | 10/2017 | Senior | ................... | G10L 15/063 |
| 9,984,683 B2* | 5/2018 | Li | ................... | G10L 15/16 |
| 2016/0284347 A1* | 9/2016 | Sainath | ................... | G10L 15/16 |
| 2017/0103752 A1* | 4/2017 | Senior | ................... | G10L 15/16 |
| 2017/0270919 A1* | 9/2017 | Parthasarathi | ................... | G10L 15/20 |
| 2017/0278514 A1* | 9/2017 | Mathias | ................... | G10L 15/22 |
| 2017/0372725 A1* | 12/2017 | Khoury | ................... | G10L 25/45 |
| 2018/0174576 A1* | 6/2018 | Soltau | ................... | G10L 15/16 |
| 2018/0232563 A1* | 8/2018 | Albadawi | ................... | G06K 9/726 |
| 2018/0232645 A1* | 8/2018 | Finkelstein | ................... | G06K 9/726 |
| 2018/0232662 A1* | 8/2018 | Solomon | ................... | G06K 9/726 |
| 2018/0233139 A1* | 8/2018 | Finkelstein | ................... | G06K 9/726 |
| 2018/0233140 A1* | 8/2018 | Koishida | ................... | G06K 9/726 |
| 2018/0233141 A1* | 8/2018 | Solomon | ................... | G06K 9/726 |
| 2018/0260680 A1* | 9/2018 | Finkelstein | ................... | G06N 3/006 |

OTHER PUBLICATIONS

Larsson, Joel, "Optimizing Text-Independent Speaker Recognition using an LSTM Neural Network," Master Thesis in Robotics, Oct. 26, 2014, 54 pages.

Sak, Haşim, et al., "Long Short-Term Memory Based Recurrent Neural Network Architectures for Large Vocabulary Speech Recognition," arXiv preprint arXiv:1402.1128, 2014, 5 pages.

Triefenbach, Fabian, et al., "Large Vocabulary Continuous Speech Recognition with Reservoir-Based Acoustic Models," IEEE Signal Processing Letters 21, No. 3, 2014, pp. 311-315.

Tang Z, et al. "Multi-task Recurrent Model for Speech and Speaker Recognition," arXiv preprint arXiv:1603.09643, Mar. 31, 2016, 5 pages.

Zhou, Bowen et al., "Efficient audio stream segmentation via the combined T 2 statistic and Bayesian information criterion." Speech and Audio Processing, IEEE Transactions on 13.4 (2005): 467-474.

Chen, Scott Shaobing et al., "Clustering via the Bayesian information criterion with applications in speech recognition." Acoustics, Speech and Signal Processing, 1998. Proceedings of the 1998 IEEE International Conference on. vol. 2. IEEE, 1998.

Siegler, Matthew A., et al. "Automatic segmentation, classification and clustering of broadcast news audio." Proc. DARPA speech recognition workshop. vol. 1997.

Jin, Qin, et al., "Speaker segmentation and clustering in meetings." INTERSPEECH. vol. 4. 2004.

George Saon, et al., The IBM Speech Activity Detection System for the DARPA RATS Program, Interspeech, Lyon, France, Aug. 2013.

List of IBM Patents or Patent Applications Treated as Related dated Dec. 14, 2016.

* cited by examiner

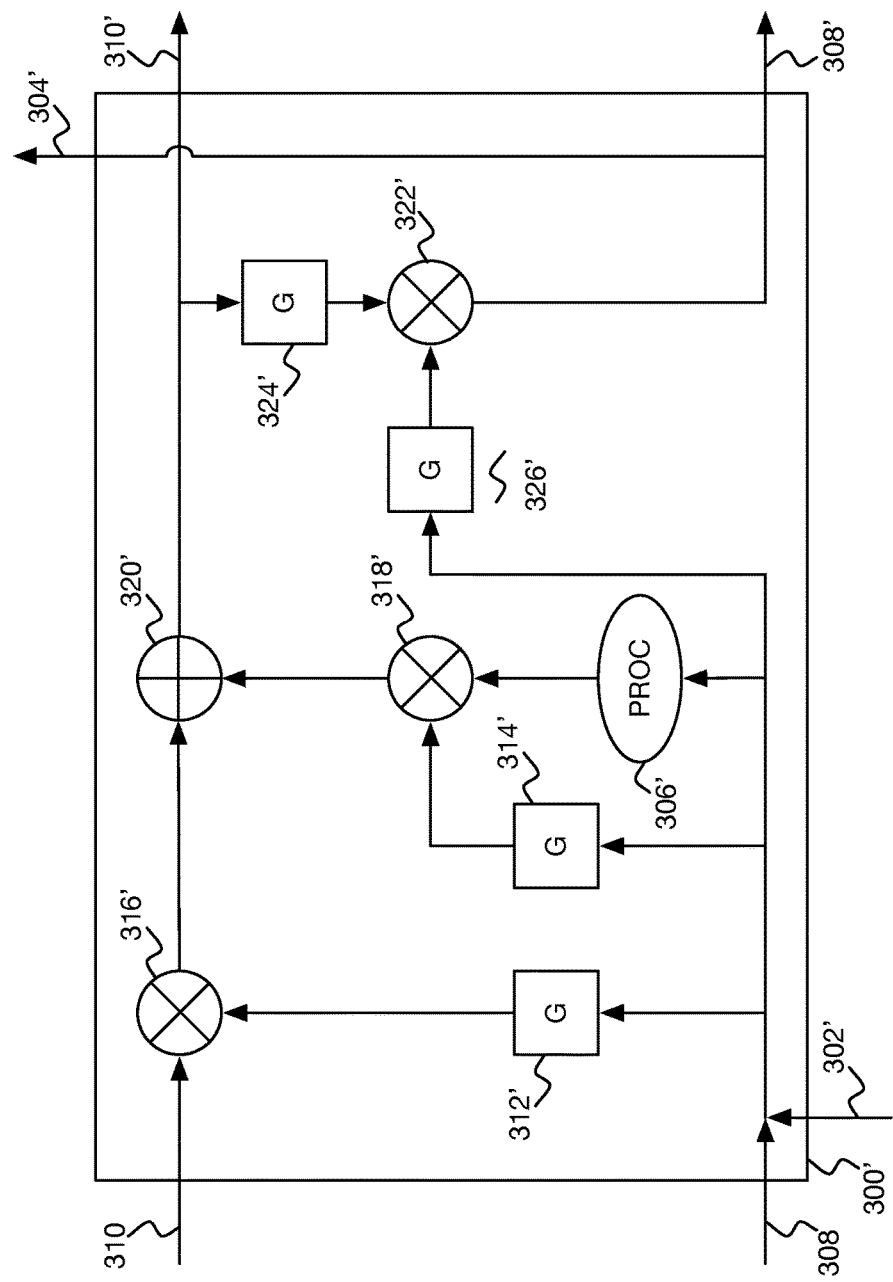

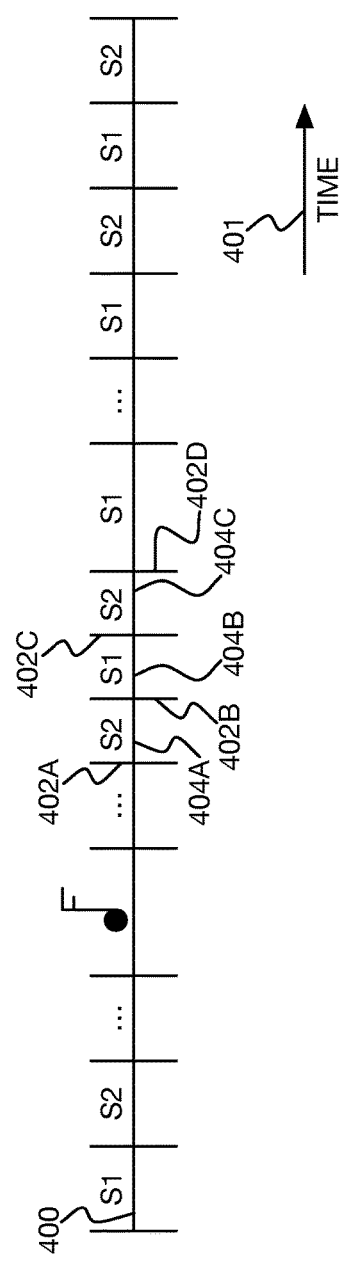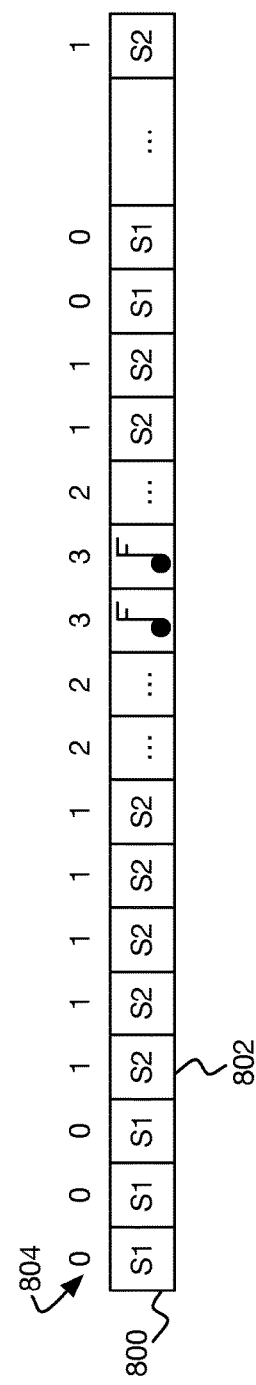

USING LONG SHORT-TERM MEMORY RECURRENT NEURAL NETWORK FOR SPEAKER DIARIZATION SEGMENTATION

BACKGROUND

Automatic speech recognition is a technology unique to computing devices of all types. Speech recognition is the recognition and translation of spoken language—i.e., speech—into text. Speech recognition can include but differs from voice recognition or speaker identification, which identifies a speaker or distinguishes speech from other audio without translating the spoken language into text. A speech recognition system can serve as a technological input device by which a user provides input to a computing device, supplementing or supplanting other input devices like keyboards and pointing devices.

SUMMARY

An example system includes a processor and a storage device. The storage device is to store audio data including speech by a first speaker type, speech by a second speaker type, and silence. The storage device stores computer-executable code that the processor is to execute. The processor is to execute the code to segment the audio data using a long short-term memory (LSTM) recurrent neural network (RNN) to identify change points of the audio data that divide the audio data into segments. Each change point is a transition from one of the first speaker type, the second speaker type, and the silence to a different one of the first speaker type, the second speaker type, and the silence type.

An example computer program product includes a computer-readable storage medium having program instructions embodied therewith. The computer-readable storage medium is not a transitory signal per se. The program instructions are executed by a computing device to apply an LSTM RNN model to audio data including speech by a first speaker, speech by a second speaker, and silence. Application of the LSTM RNN model to the audio data segments the audio data into segments. Each segment corresponds to one of the first speaker, the second speaker, and the silence. The program instructions are executed by a computing device to perform speech recognition on the segments that each correspond to one of the first speaker and the second speaker.

An example method includes receiving, by a computing device, frames of audio data as the frames are generated. The audio data includes speech by a first speaker, speech by a second speaker, and silence. The method includes, as the frames are received, assigning, by the computing device, labels to the frames from a group of labels using an LSTM RNN. The group of labels includes labels corresponding to the first speaker, the second speaker, and the silence. The method includes, as the labels are assigned to the frames, grouping, by the computing device, the frames into sequential segments demarcated by transitions in the audio data from one of the first speaker, the second speaker, and the silence to a different one of the first speaker, the second speaker, and the silence. The method includes, as the frames are grouped into the sequential segments, performing, by the computing device, speech recognition on the sequential segments that each correspond to one of the first speaker and the second speaker.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a diagram of an example long short-term memory (LSTM) RNN block.

FIG. 4 is an illustrative diagram of example speaker diarization, including audio data segmenting and audio data segment labeling.

FIG. 8 is a diagram of example training audio data including frames that have been manually assigned labels.

DETAILED DESCRIPTION

Figure 1:
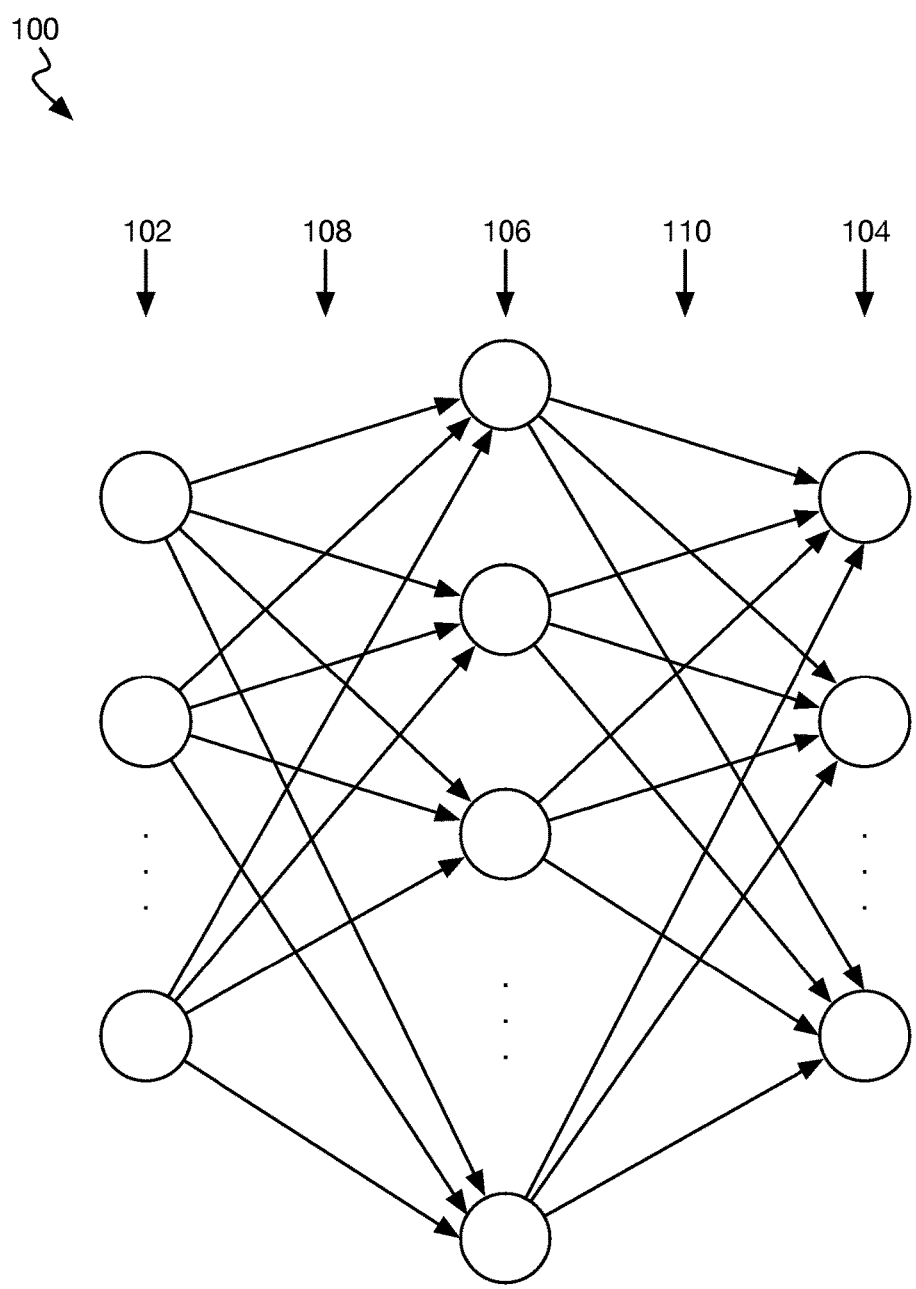
FIG. 1 is a diagram of an example neural network.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, speech recognition is a technology that recognizes and translates spoken language into text. What is referred to as large vocabulary continuous speech recognition (LVCSR) can convert speech from audio data into text in an unsupervised manner, even when the audio data includes audio other than the speech, such as silence and music, and when the audio data includes speech spoken by different speakers. For improved accuracy, speaker diarization can be performed prior to actually performing speech recognition on the audio data.

Speaker diarization includes the process of partitioning audio data into homogeneous segments according to their speakers. Therefore, within an audio stream or other audio data, change points can be identified, where each change point can correspond to a transition from one particular speaker, silence, or music to a different particular speaker, silence, or music. A change point corresponding to a transition from one speaker to another speaker is referred to as a speaker turn.

By identification of the change points within an audio stream, the audio stream is partitioned into homogeneous segments. The segments can have labels assigned that correspond to the speakers that articulated the corresponding portions of the audio stream, or that correspond to silence, music, and so on. The segments may be clustered or otherwise grouped by their assigned labels. Such segmentation, with or without subsequent grouping, can provide for improved accuracy in the resulting speech recognition that is performed. This can be because extraneous audio, such as silence and music, is not subjected to speech recognition, and also because specific characteristics of one speaker does not influence speech recognition of the speech of another speaker.

Disclosed herein are techniques that employ a long-short term memory (LSTM) recurrent neural network (RNN) to segment audio data into segments and assign a label to each segment. An LSTM RNN model is applied to audio data that includes speech by a number of different speakers, and silence, and which may include music. Application of the LSTM RNN model segments the audio data into segments that each correspond to one of the speakers, or silence (or music if present). Application of the LSTM RNN model also assigns a label, from a group of labels, to each segment. The labels correspond to the different speakers, and silence (and music if present).

An RNN is a type of artificial neural network in which connections among units form a directed cycle. The RNN has an internal state that allows the network to exhibit dynamic temporal behavior. Unlike feed-forward neural networks, for instance, RNNs can use their internal memory to process arbitrary sequences of inputs. An LSTM RNN further includes LSTM units, instead of or in addition to standard neural network units. An LSTM unit, or block, is a "smart" unit that can remember, or store, a value for an arbitrary length of time. An LSTM block contains gates that determine when its input is significant enough to remember, when it should continue to remember or forget the value, and when it should output the value.

Employing an LSTM RNN model in speaker diarization advantageously can provide for concurrently segmenting audio data and assigning labels to the partitioned segments. Such technologically improved speaker diarization can improve the accuracy of the resulting speech recognition of the audio data that is performed on the segmented and labeled audio data. As such, the techniques disclosed herein provide a technical improvement to speech recognition technology, by improving the accuracy of speech recognition on audio data that can include speech articulated by multiple speakers and that can include silence and/or music.

FIGS. 1, 2A and 2B, and 3 are presented to provide an overview of a neural network 100, an RNN block 200, and an LSTM RNN block 300, respectively. FIG. 1 shows an example neural network 100. The network 100 includes input nodes, blocks, or units 102; output nodes, blocks, or units 104; and hidden nodes, blocks, or units 104. The input nodes 102 are connected to the hidden nodes 106 via connections 108, and the hidden nodes 106 are connected to the output nodes 104 via connections 110.

The input nodes 102 correspond to input data, whereas the output nodes 104 correspond to output data as a function of the input data. For instance, the input nodes 102 can correspond to audio data and the output nodes 104 can correspond to segmentation and labeling of the audio data. The nodes 106 are hidden nodes in that the neural network model itself generates the nodes. Just one layer of nodes 106 is depicted, but in actuality there is usually more than one layer of nodes 106.

Therefore, to construct the neural network 100, training data in the form input data that has been manually or otherwise already mapped to output data is provided to a neural network model, which generates the network 100. The model thus generates the hidden nodes 106, weights of the connections 110 between the input nodes 102 and the hidden nodes 106, weights of the connections 110 between the hidden nodes 106 and the output nodes, and weights of connections between layers of the hidden nodes 106 themselves. Thereafter, the neural network 100 can be employed against input data for which output data is unknown to generate the desired output data.

An RNN is one type of neural network. A general neural network does not store any intermediary data while processing input data to generate output data. By comparison, an RNN does persist data, which can improve its classification ability over a general neural network that does not.

Figure 2A:
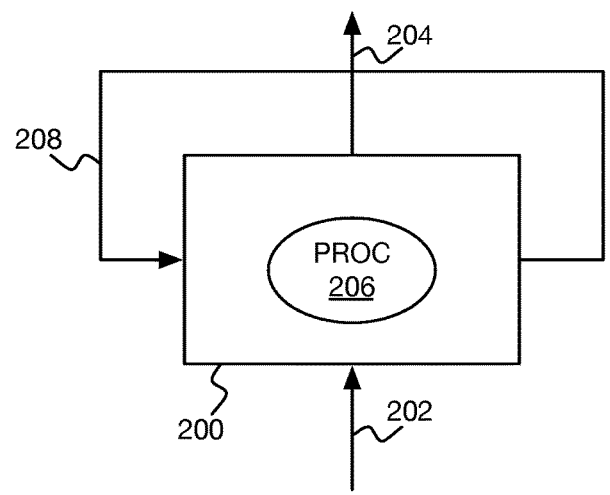
FIGS. 2A and 2B are diagrams of an example general recurrent neural network (RNN) block.

FIG. 2A shows a compact notation an example RNN block 200, which typifies a hidden node 106 of a neural network 100 that is an RNN. The RNN block 200 has an input connection 202, which may be a connection 108 of FIG. 1 that leads from one of the input nodes 102, or which may be a connection that leads from another hidden node 106. The RNN block 200 likewise has an output connection 204, which may be a connection 110 of FIG. 1 that leads to one of the output nodes 104, or which may be a connection that leads to another hidden node 106.

The RNN block 200 generally is said to including processing 206 that is performed on (at least) the information provided on the input connection 202 to yield the information provided on the output connection 204. The processing 206 is typically in the form of a function. For instance, the function may be an identity activation function, mapping the output connection 204 to the input connection 202. The function may be a sigmoid activation function, such as a logistic sigmoid function, which can output a value within the range (0, 1) based on the input connection 202. The function may be a hyperbolic tangent function, such as a hyperbolic logistic tangent function, which can output a value within the range (−1, 1) based on the input connection 202.

The RNN block 200 also has a temporal loop connection 208 that leads back to a temporal successor of itself. The connection 208 is what renders the block 200 recurrent, and the presence of such loops within multiple nodes is what renders a neural network 100 recurrent. The information that the RNN block 200 outputs on the connection 204 (or other information) therefore can persist on the connection 208, on which basis new information received on the connection 202 can be processed. That is, the information that the RNN block 200 outputs on the connection 204 is merged, or concatenated, with information that the RNN block 200 next receives on the input connection 202, and processed via the processing 206.

Figure 2B:
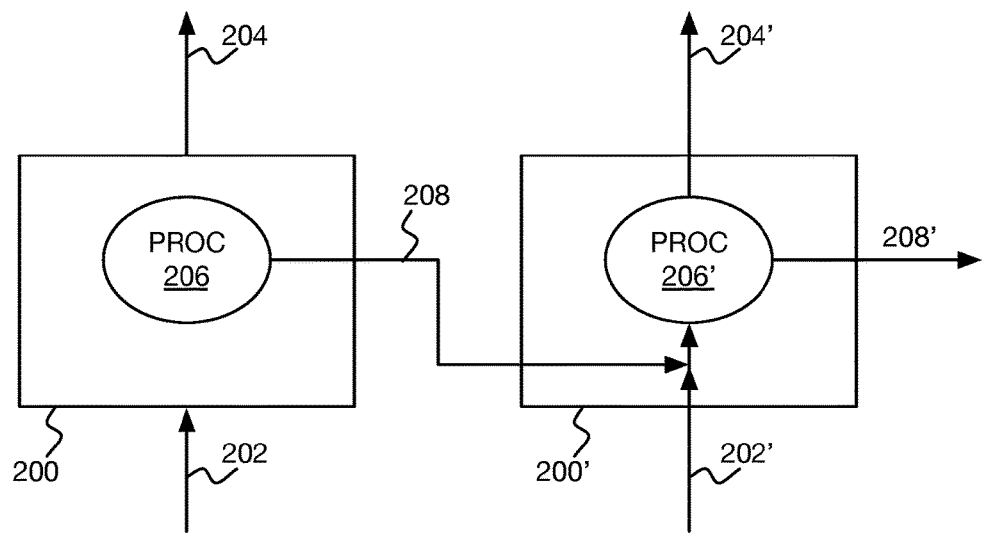

FIG. 2B shows an expanded notation of the RNN block 200. The RNN block 200' and the connections 202', 204', 206', 208' are the same RNN block 200 and the connections 202, 204, 206, 208, but at a temporally later time. FIG. 2B thus better illustrates that the RNN block 200' at the later time receives the information provided on the connection 206 provided by the (same) RNN block 200 at an earlier time. The RNN block 200' at the later time can itself provide information to itself at an even later time on the connection 206'.

An LSTM RNN is one type of RNN. A general RNN in theory can persist information over both the short term and the long term. However, in practice, such RNNs have not been proven capable of persisting information over the long term. More technically, a general RNN is practically incapable of learning long-term dependencies, which means that the RNN is unable to process information based on information that it previously processed a relatively long. By comparison, an LSTM RNN is a special type of RNN that can learn long-term dependencies, and therefore a type of RNN that can persist information over the long term.

FIG. 3 shows an example LSTM RNN block 300'. The LSTM RNN block 300' has an input connection 302', an output connection 304', and processing 306', comparable to the connections 202/202' and 204/204', and processing 206/206' of the RNN block 200/200' of FIGS. 2A and 2B. However, rather than having a single temporal loop connection 208/208' that connects temporal instances of the RNN block 200/200', the LSTM RNN block 300' has two temporal loop connections 308' and 310' over which information persists among temporal instances of the LSTM RNN block 300.

The information on the input connection 302' is merged with the persistent information provided on the connection 308 from a prior temporal instance of the LSTM RNN block and undergoes the processing 306'. How the result of the processing 306' is combined, if at all, with the persistent information provided on the connection 310 from the prior temporal instance of the LSTM RNN block is controlled via gates 312' and 314'. The gate 312', operating on the basis of the merged information of the connections 302' and 308, controls an element-wise product operator 316' permitting the persistent information on the connection 310 to pass (or not). The gate 314', operating on the same basis, controls an element-wise operator 318' permitting of the output of the processing 306' to pass (or not).

The outputs of the operators 316' and 318' is summed via an addition operator 320', and is passed as the persistent information on the connection 310' of the current instance of the LSTM RNN block 300'. Therefore, the extent to which the persistent information on the connection 310' reflects the persistent information on the connection 310 and the extent to which this information on the connection 310' reflects the output of the processing 306' is controlled by the gates 312' and 314'. As such, information can persist across or over multiple temporal instances of the LSTM RNN block as desired.

The output of the current instance of the LSTM RNN block 300' is itself provided on the connection 304' to the next layer of the RNN, and also persists to the next temporal instance of the LSTM RNN block on connection 308'. This output is provided by another element-wise product operator 322', which passes a combination of the information also provided on the connection 310' and the merged information on the connections 302' and 308 as controlled by the gates 324' and 326', respectively. In this way, then, the LSTM RNN block 300' of FIG. 3 can persist both long-term as well as short-term information, whereas the RNN block 200/200' of FIGS. 2A and 2B has difficulty learning long-term dependencies.

Figure 5:
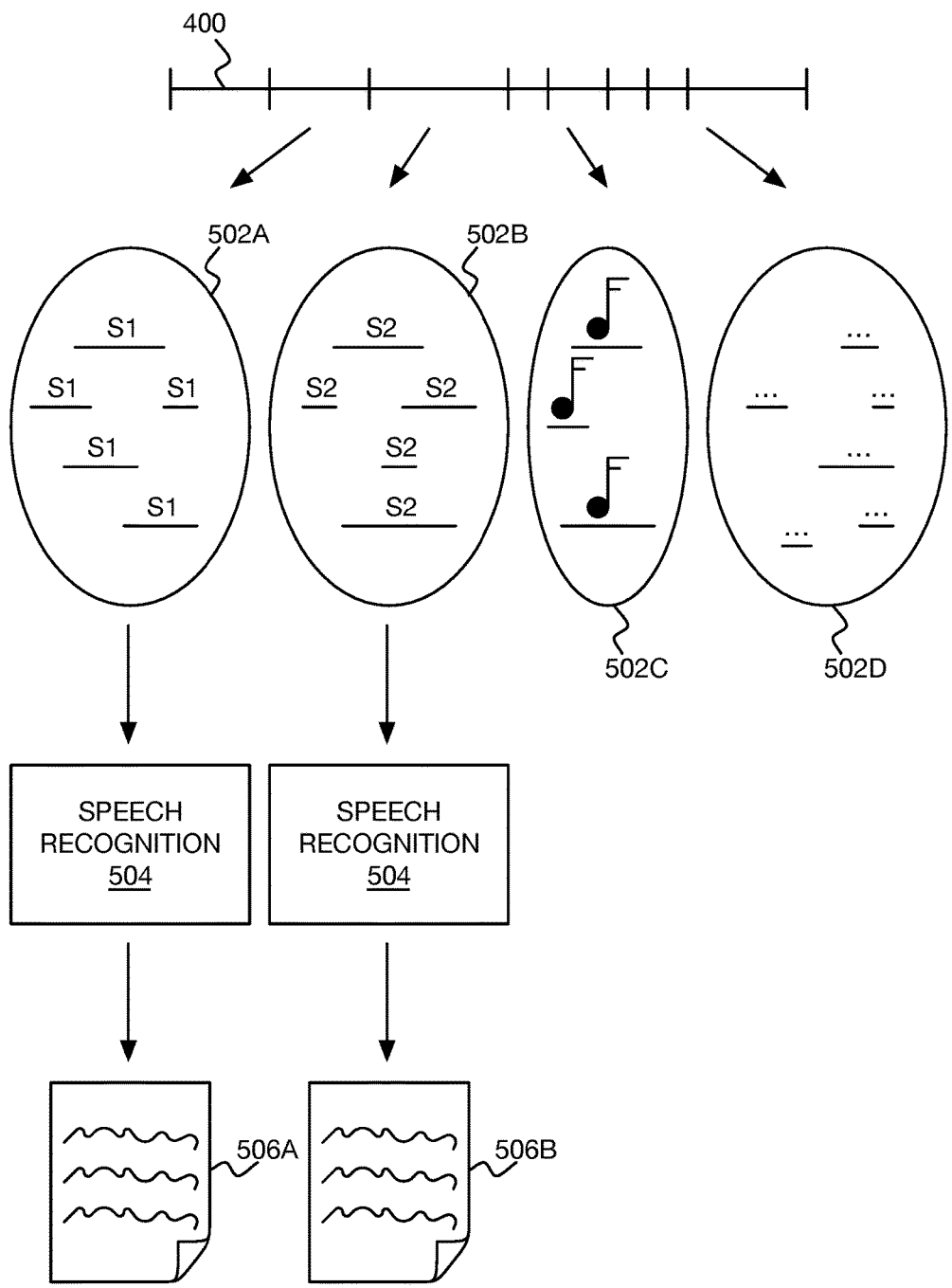
FIG. 5 is an illustrative diagram of example offline speech recognition.
Figure 6:
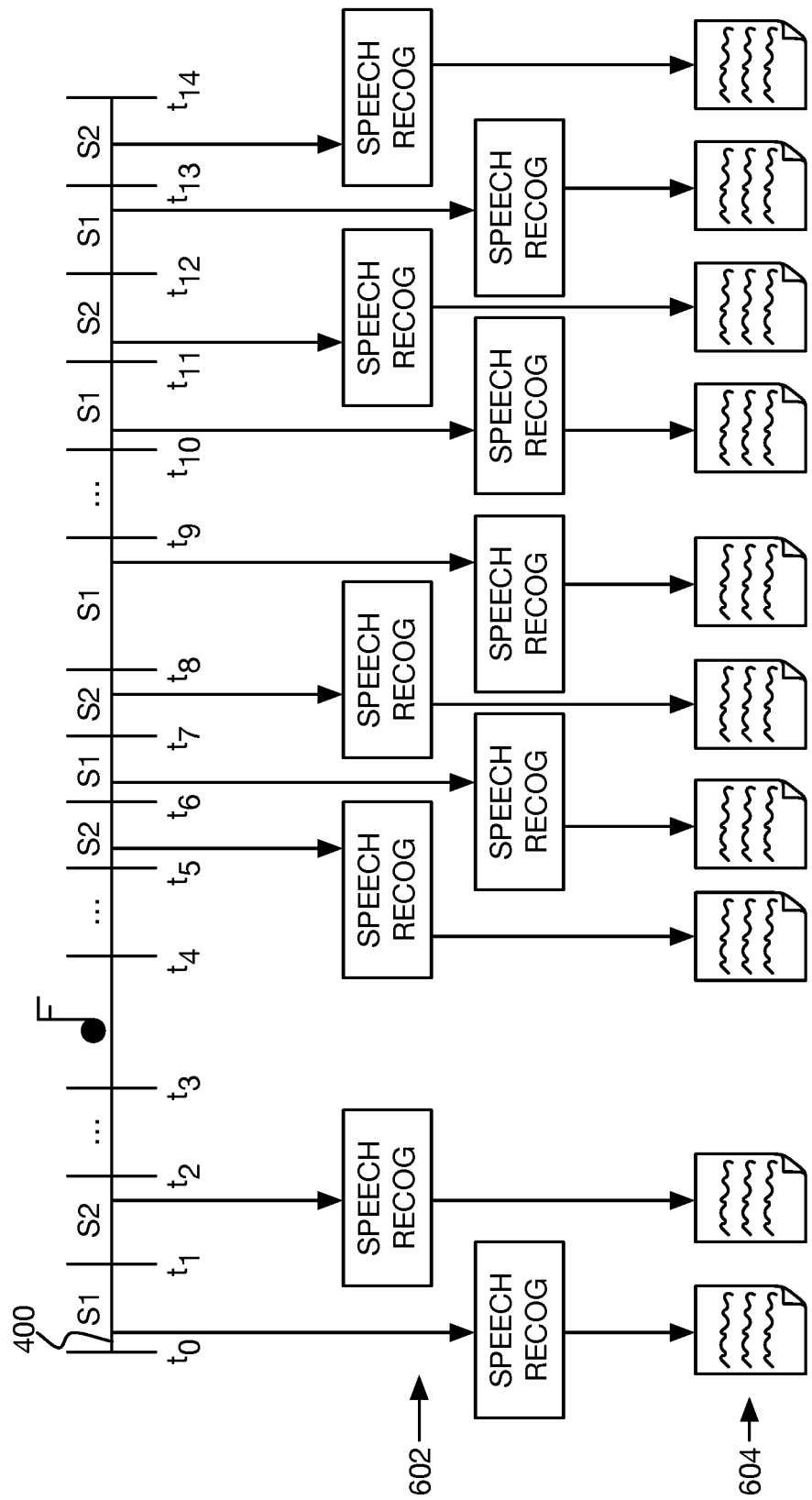
FIG. 6 is an illustrative diagram of example online speech recognition.

FIGS. 4, 5, and 6 are presented to depict an illustrative overview of speaker diarization and speech recognition of audio data. The audio data generally includes speech of multiple speakers and silence, and can also include music. There are at least two speakers, and the techniques described herein can be employed for any number of speakers. However, for illustrative and descriptive clarity and convenience, audio data including just two speakers—namely, a first speaker and a second speaker—is described. It is to be appreciated, then, that such audio data is presented as an example, and more generally, there are multiple speakers.

FIG. 4 shows an example of speaker diarization, including segmentation and label assignment, of audio data 400. The audio data 400 is represented in FIG. 4 as a line, and FIG. 4 depicts the type of sound generated at each point over the passage of time indicated by an arrow 401. The audio data 400 may thus be an audio stream that is processed as the audio data is generated in time. Within the audio data, during some periods of time a first speaker, S1, is speaking, and during other periods of time a second speaker, S2, is speaking. During still other periods of time there is silence, represented by ellipses (" . . . ") in FIG. 4, and during yet other periods of time music is placing, represented by a musical note symbol. As an example of the audio data 400, the first speaker may be an end user who calls a technical support line, and has a conversation with the second speaker who may be a technical support representative. During the phone call, the second speaker may place the first speaker on hold, during which time background music is automatically played.

A previously trained LSTM RNN model is applied to the audio data 400 to partition the audio data 400 into segments by identifying change points within the audio data 400 that each demarcate the end of the current segment and the start of a new segment. As examples, four change points 402A, 402B, 402C, and 402D, collectively referred to as the change points 402, are referenced in FIG. 4, which define or partition three adjacent segments 404A, 404B, and 404C, collectively referred to as the segments 404. The change points 402A and 402B demarcate the start and end of the segment 404A corresponding to the second speaker speaking; the change points 402B and 402C demarcate the start and end of the segment 404B corresponding to the first speaker speaking; and the change points 402C and 402D demarcate the start and end of the segment 404C corresponding to the second speaker (again) speaking.

Application of the LSTM RNN model also assigns each segment with a label corresponding to the speaker articulating the speech of the segment, to the silence within the segment, or to the music playing within the segment. As such, each segment of the audio data 400 has one of four different labels: a label corresponding to the first speaker, a label corresponding to the second speaker, a label corresponding to silence, or a label corresponding to music. The particularly referenced segments 404A, 404B, and 404C, for instance, have the labels S2, S1, and S2, respectively.

As noted above, audio data more generally can include more than two speakers. There can thus be a label for each speaker. For example, if there are three speakers, there can be three labels that each correspond to a different speaker. Labels may instead be assigned to types of speakers. For example, one label may be assigned to female speakers, and another label may be assigned to male speakers. Most generally, the segmentation of audio data partitions the audio data into homogeneous segments, which may be by speaker, speaker type, and so on, as to articulated speech.

FIG. 5 shows an example of one type of speech recognition of segmented audio data 400. In the example of FIG. 5, the segments of the audio data 400 is first grouped into groups 502A, 502B, 502C, and 502D, collectively referred to as the groups 502, corresponding to the first speaker, the second speaker, silence, and music, respectively. For example, the audio data segments corresponding to the first speaker can be clustered in the group 502A, the audio data segments corresponding to the second speaker can be clustered in the group 502B, the audio data segments corresponding to music can be clustered in the group 502C, and the audio data segments corresponding to silence can be clustered in the group 502D.

The segments of the groups 502A and 502B corresponding to the first and second speakers undergo speech recognition processing 504 to generate textual transcriptions 506A and 506B, respectively, of the speech articulated by the speakers. Speech recognition processing 504 can be performed on the segments of the group 502A separately from the segments of the group 502B. For instance, such speech recognition processing 504 can be speaker-adaptive (SA) speech recognition, which takes into account the characteristics of a speaker when performing the speech recognition. Accuracy can be improved, because the speech recognition system can take into consideration that all the segments of the group 502A are from one speaker, and likewise that all the segments of the group 502B are from one different speaker.

The speech recognition example of FIG. 5 is particularly well suited for recorded audio data that does not have to be automatically transcribed in real-time as the audio data is generated. This permits the speech recognition process to perform recognition on a later-recorded segment than an earlier recorded segment. For example, a phone call may be recorded, and at the conclusion of the call, undergo the diarization process of FIG. 4 and then the recognition process of FIG. 5. Such offline processing may result in improved accuracy, because generation of the transcriptions 506 (encompassing the transcriptions 506A and 506B) does not have to occur in real-time.

FIG. 6 shows an example of another type of speech recognition of segmented audio data 400. In the example of FIG. 6, the segments of the audio data 400 undergo speech recognition 602 to generate corresponding textual transcriptions 604 as soon their ends are identified, if the segments correspond to speech from the first speaker or the second speaker. Therefore, when a change point is detected within the audio data, and the current segment having the end to which the change point corresponds is for the first speaker to the second speaker, then the segment can immediately undergo speech recognition 602 to generate a transcription 604 of the segment.

For example, at time t0 the audio data 400 starts being generated, or starts being received or read. At time t1 a change point is detected, corresponding to a speaker turn from the first speaker to the second speaker, such that the segment between times t0 and t1 has speech recognition 602 performed thereon to generate a textual transcription 604 of the segment. Likewise, at time t2 another change point is detected, and the segment between times t1 and t2 has speech recognition 602 performed thereon to generate a transcription 604 of this segment. No speech recognition is applied to the segments ending at the times t2, t3, t4, and t5, because the segments between the times t2 and t3, the times t3 and t4, and the times t4 and t5 correspond to silence or music. This process continues from time t6 through time t14, when the audio data 400 stops being generated, or has been finished being received or read.

The speech recognition 602 can be speaker-independent (SI) speech recognition, which does not take into account the characteristics of a speaker when performing the speech recognition. The speech recognition example of FIG. 6 is particularly well suited for audio data generated in real-time, and for which automatic transcription in substantially real-time is desired. As speaker turns occur in real-time the audio data 400, corresponding segments can be identified via the diarization process of FIG. 4, and subjected to the recognition process of FIG. 6. Such online processing therefore performs immediate or near-immediate generation of the transcriptions 604.

Figure 7:
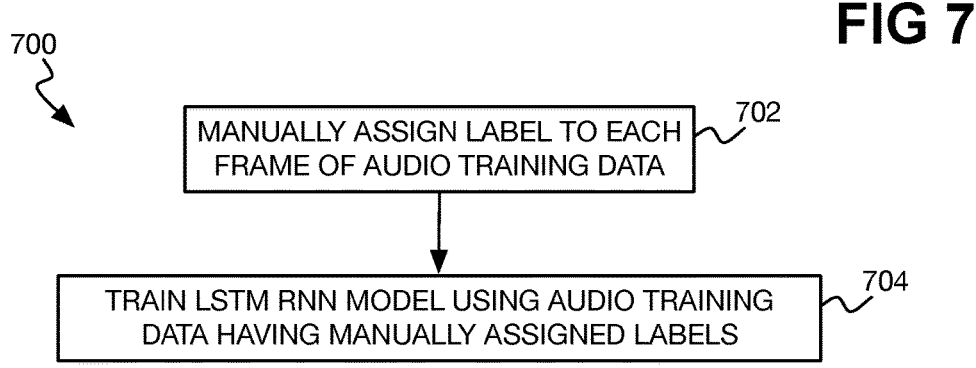
FIG. 7 is a flowchart of an example method for training an LSTM RNN model using training audio data including frames that have been manually assigned labels.

FIG. 7 shows an example method 700 for training an LTSM RNN model. Audio training data is divided into a number of consecutively adjacent frames. Each frame has the same time duration. The time duration by which to divide the audio training data into frames can be selected based on the desired granularity in partitioning audio data into segments using the LSTM RNN model. For instance, the time duration of each frame may be measurable in milliseconds, such as twenty milliseconds, where the frames are extracted every ten milliseconds. When the LSTM RNN is subsequently used to partition audio data into segments, each segment will include at least one frame, and most segments will include multiple consecutively adjacent segments.

The method 700 includes a user manually assigning a label to each frame of the audio training data (702). For example, the user can employ a computer program that outputs the audio training data over a speaker, and permits the user to pause, play, and advance in both forward and reverse directions through the audio. The user may provide input to the computer program to specify that a current frame is to be assigned a particular label based on the speaker, silence, or music that the user hears from the speaker. Subsequent frames may be assigned the same label until the user specifies a different label to be assigned.

In one implementation, each frame of the audio training data is assigned one of four labels: 0 to denote that a first speaker is speaking; 1 to denote that a second speaker is speak; 2 to denote silence; and 3 to denote that music is playing. The decision as to which speaker is the first speaker and which speaker is the second speaker can be arbitrary. If there are more than two speakers, additional labels can be used. The labels in this implementation are thus numeric. The highest two numeric labels may always correspond to silence and music, respectively, or labels 2 and 3 may be reserved for silence and music, with higher numbered labels corresponding to speakers other than the first two speakers.

FIG. 8 shows example audio training data 800. The audio training data 800 has been divided into consecutively adjacent frames 802 of equal time length. Numeric labels 804 have been assigned to the frames 802 in conjunction with part 702 of the method 700. For example, the first three frames 802 correspond to the first user speaking, and therefore each of these frames 802 has been assigned the label 0. The next four frames 802 correspond to the second user speaking, and each has been assigned the label 1. The following two frames 802 correspond to silence and have each been assigned the label 2, and the two frames 802 thereafter correspond to music and have each been assigned the label 3.

Referring back to FIG. 7, once labels have been manually assigned to the frames of the audio training data, the LSTM RNN model is then trained using the audio training data (704). Training the LSTM RNN model includes running a computer program that programs each node, unit, or block of the LSTM RNN so that the LSTM RNN properly outputs the label that has been manually assigned to each frame. By being able to properly assign an audio data frame with a label, the LSTM RNN model can thus identify segments of the audio corresponding to these labels over time, including the start and end of each segment. A segment, that is, includes one or more consecutively adjacent frames that have the same label.

Application of the LSTM RNN model to audio data results in the LSTM RNN providing a posterior probability to each frame of the audio data for each label. The posterior probability assigned to a frame for a label is the statistical probability assigned by the model that the frame includes audio corresponding to the label. In an implementation in which there are four labels corresponding to the first speaker, the second speaker, silence, and music, therefore, the model generates four posterior probabilities to each frame. For example, a frame may have a probability p0 for label 0, a probability p1 for label 1, a probability p2 for label p2, and a probability p3 for label p3.

The posterior probabilities of the frames can thus be used to partition the audio data into consecutive segments having differing labels. The end of one segment and the start of another segment is a change point within the audio data between two consecutive frames. In one implementation, an ergodic hidden Markov model (HMM) is applied to the posterior probabilities to provide this segmentation and corresponding labeling. For instance, the ergodic HMM can correspond to a finite state machine (FSM) having a number of states equal to the number of labels. When the FSM transitions to a different state with a particular frame, this transition corresponds to a change point within the audio data signifying the end of the current segment having a label of the prior state and the start of a new segment having a label of the new (different) state.

Other approaches to use the posterior probabilities of the frames to partition the audio data into label segments can also be employed that do not use an ergodic HMM corresponding to an FSM. For example, a frame can be assigned the label for which it has been assigned the highest posterior probability. When a current frame is assigned a label that differs from the label assigned to the prior frame, this transition corresponds to a change point signifying the end of the current segment having the label assigned to the preceding frames and the start of a new segment having a label of the current frame. However, using an ergodic HMM corresponding to an FSM is beneficial because such an MINI smooths temporal trajectories within the audio data, which would otherwise result in a larger number of shorter length segments.

Figure 9:
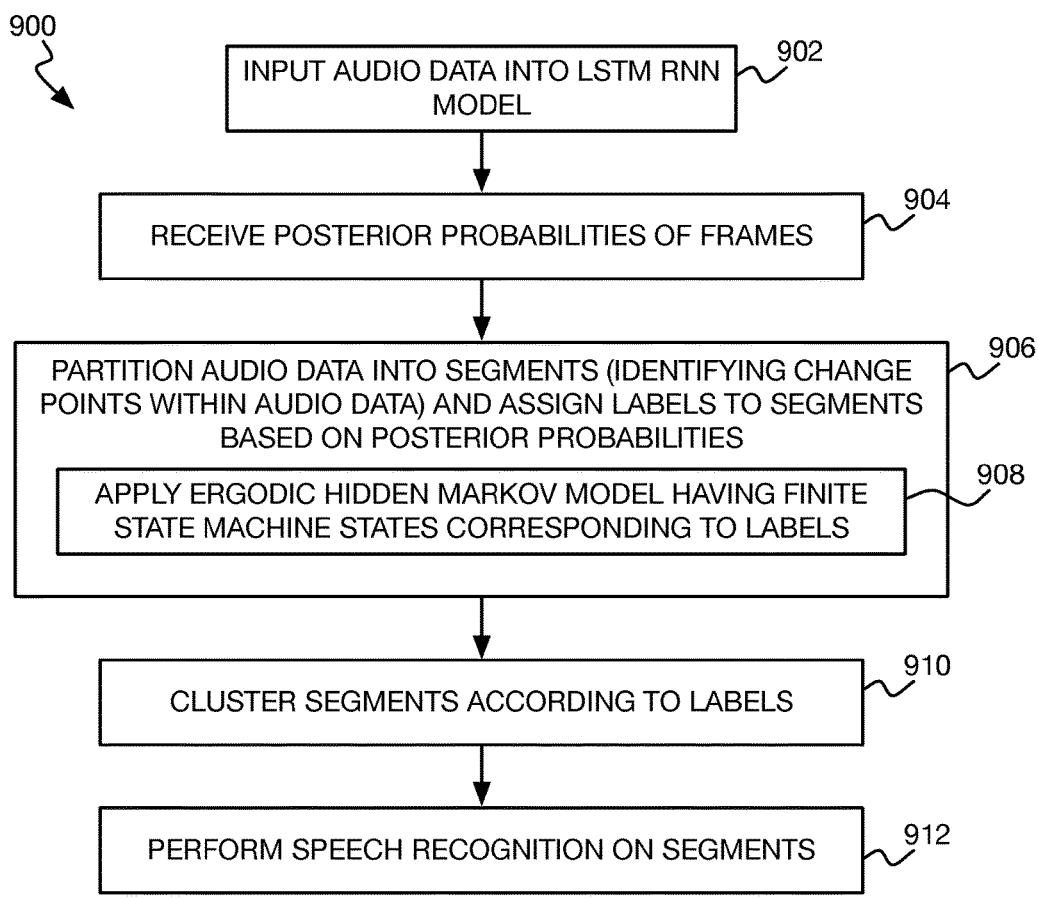
FIG. 9 is a flowchart of an example method for performing speech recognition on audio data, including preliminary performing speaker diarization on the audio data via a previously trained LSTM RNN.

FIG. 9 shows an example method 900 for performing automatic speech recognition on audio data in which the audio initially undergoes speaker diarization using an LSTM RNN. The method 900 is performed by a computing device, such as a processor thereof, executing computer-executable code. Parts 902, 904, 906, and 908 correspond to speaker diarization. More specifically, parts 902, 904, 906, and 908 of the method 900 correspond to application of an LSTM RNN to segment audio data into segments and concurrently label the segments.

The audio data is thus input into an LSTM RNN model that has been previously trained (902). As such, posterior probabilities of the frames of the audio data are received from the LSTM RNN (904). The audio data is partitioned into segments, such as by identifying change points within the audio data that each correspond to the end of one segment and the start of another segment, and labels are assigned to the segments (906). The partitioning of the audio data into segments and the labeling of the segments can occur at the same time—i.e., concurrently with one another, as a result of application of the LSTM RNN model.

As noted above, partitioning the audio data into segments and assigning labels to the segments can include applying an ergodic HMM corresponding to a finite state machine having states that themselves correspond to the different labels (908). The result of application of the LSTM RNN model, therefore, is the partitioning of the audio data into labeled segments. The segments can be identified by consecutive change points within the audio data, where each segment is defined by a start change point and an end change point, and where the end change point of one segment is the start change point of another segment.

The segments into which the audio data has been partitioned may themselves be clustered or otherwise grouped into clusters or groups corresponding to the labels (910), as described above in relation to FIG. 5. Finally, speech recognition is performed on the segments as may have been clustered (912). The speech recognition may be SA speech recognition, as noted above in relation to FIG. 5, or SI speech recognition, as noted above in relation to FIG. 6. The former type of speech recognition may be employed when the audio data has been previously recorded and is being processed offline, and where the resulting segments have been clustered. The latter type of speech recognition may be employed when the audio data is being generated and provided in real-time, and this is being process online. In this latter case, the segments may not be clustered, but may instead by subjected to speech recognition as they are identified.

Figure 10:
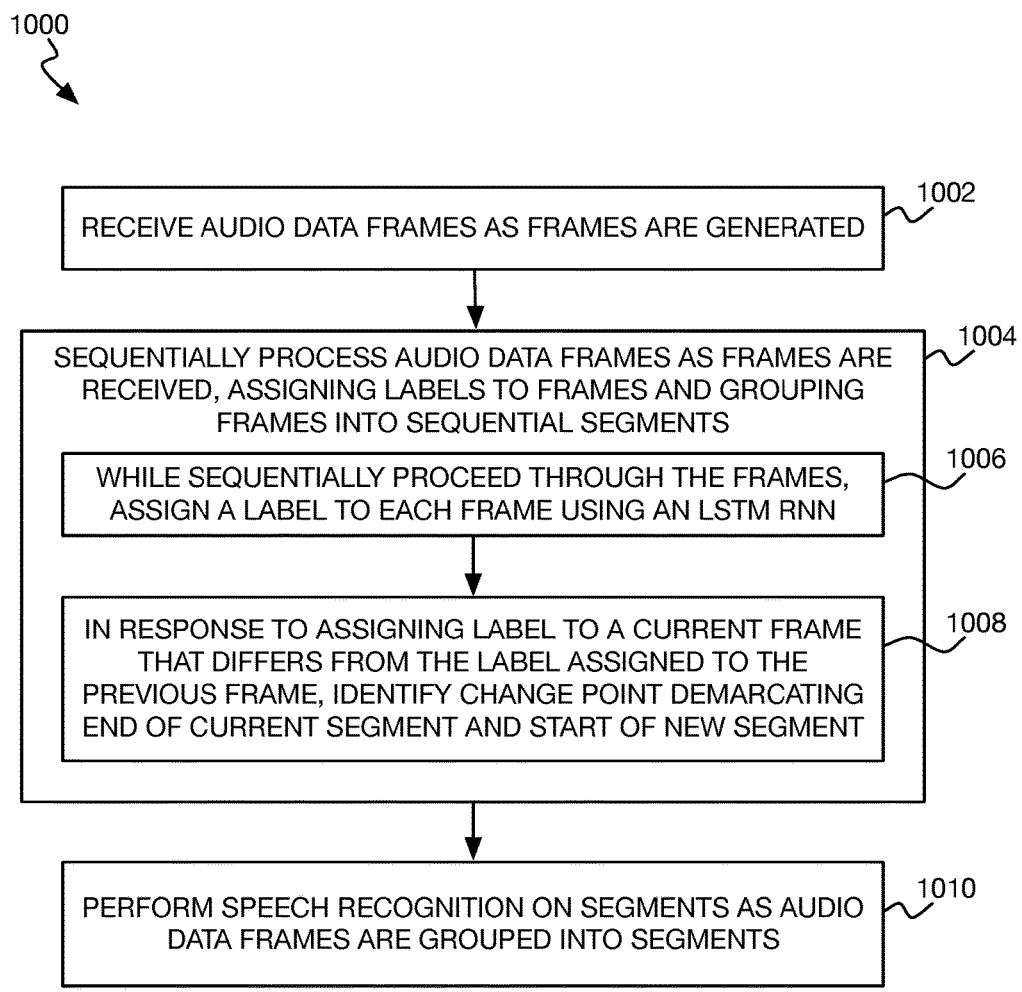
FIG. 10 is a flowchart of an example method of functional performance of the method of FIG. 9 in a case in which speech recognition is performed in an online manner consistent with FIG. 6.
Figure 11:
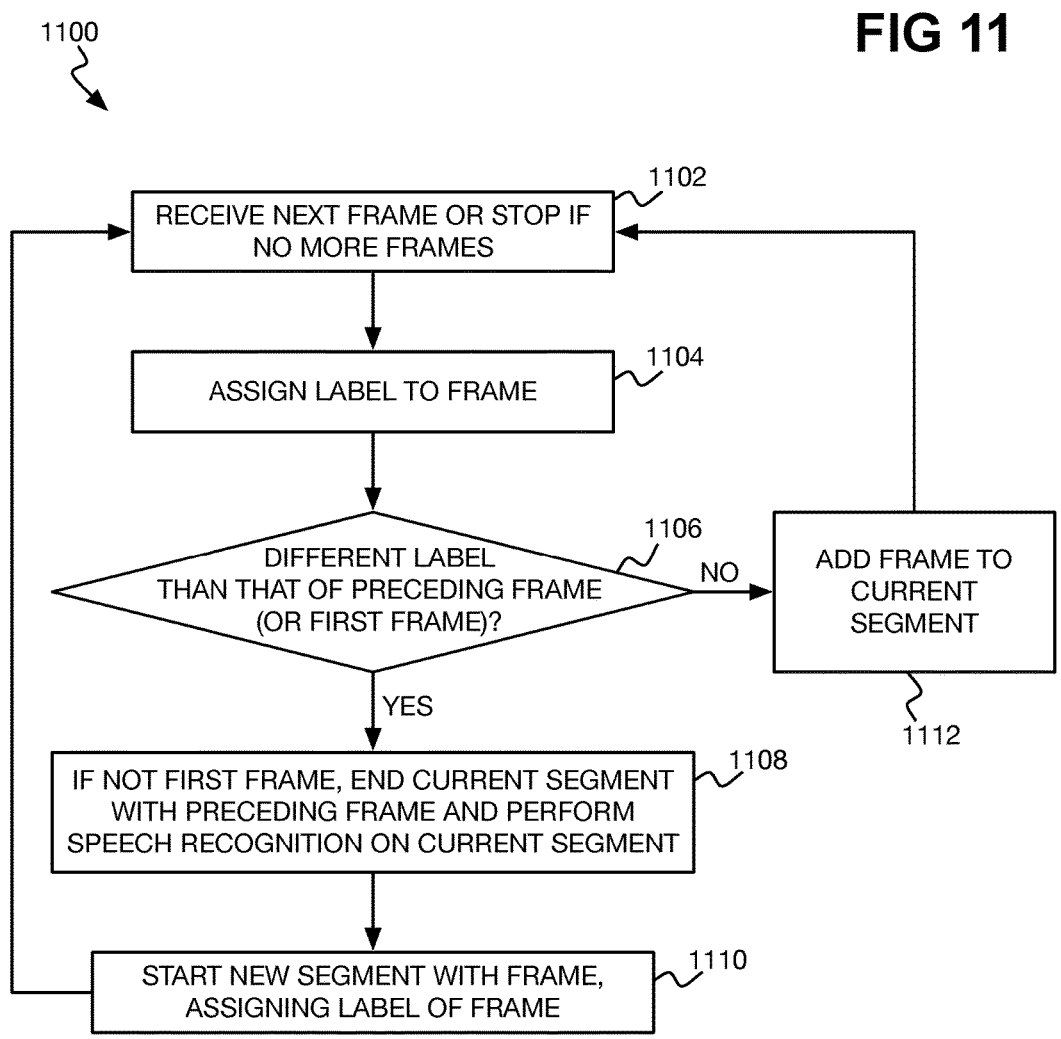
FIG. 11 is a flowchart of an example method of step-by-step performance of the method of FIG. 9 in the case in which speech recognition is performed in an online manner consistent with FIG. 6, corresponding to FIG. 10.

FIGS. 10 and 11 show example methods 1000 and 1100, respectively, of this latter type of speech recognition, in which audio data segments can undergo speech recognition as they are identified, including as the audio data itself is generated. A computing device can perform the methods 1000 and 1100 by executing computer-executable code. The method 1000 depicts the technique of FIGS. 10 and 11 in a functional manner, whereas the method 1100 depicts this technique in a more step-by-step manner.

In the method 1000, the audio data frames can be received as they are generated (1002). The audio data frames are sequentially processed as they are received (1004), in that labels are assigned to the frames and the frames are grouped into sequential segments using an LSTM RNN as the frames are received. That is, a label is assigned to each frame upon its receipt, using the LSTM RNN (1006), and when a label is assigned to a current frame that differs from the label that has been assigned to the immediately prior frame, a change point is identified (1008). This change point demarcates the end of a current segment and the start of a new segment. Therefore, speech recognition can be performed on the segments as the audio data frames are grouped into segments in this manner (1010).

The method 1100 depicts this approach of the method 1000 in a more step-by-step manner. The next audio data frame is received from the audio data (1102), or the method 1100 is finished when there are no more frames within the audio data. The next frame in this respect can be the first frame of the audio data. An audio data frame can be received as soon as it is generated, such that processing occurs in real-time and "on the fly," or can be received as soon as it is retrieved from audio data, which may have been previously generated and subsequently stored.

A label is assigned to the frame using an LSTM RNN as has been described (1104). If this label is different than the label assigned to the immediately previous frame, or if the frame is the first frame of the audio data (1106), then the following occurs. If the frame is not the first frame, than a segment will have already been started, in which case this current segment is ended at the preceding frame (1108). Speech recognition can then be performed on this segment. Speech recognition can be performed in a parallel process to the identification of segments. That is, speech recognition can immediately occur on a segment once it has been identified.

Thus, when a label different than the label assigned to the prior frame has been assigned to the current frame—or if the current frame is the first frame—a new segment is started with the current frame (1110). The label of the new segment is the label of the current frame. The method 1100 is then repeated at part 1102. However, when a label is assigned to a frame that is the same as that as that of the preceding frame (1106), then the frame is just effectively added to the current segment (1112), and the method 1100 is again repeated at part 1102.

As such, in the method 1100, as frames are received they are added to a segment so long as they are assigned the same label as the label of the segment. When a frame is assigned a different label than the label of the segment, then the segment is complete and can undergo speech recognition. A new segment is started with the frame having the different label, and the process repeated. The method 1100 therefore explicates parts 1006 and 1008 of part 1004 of the method 1000.

Figure 12:
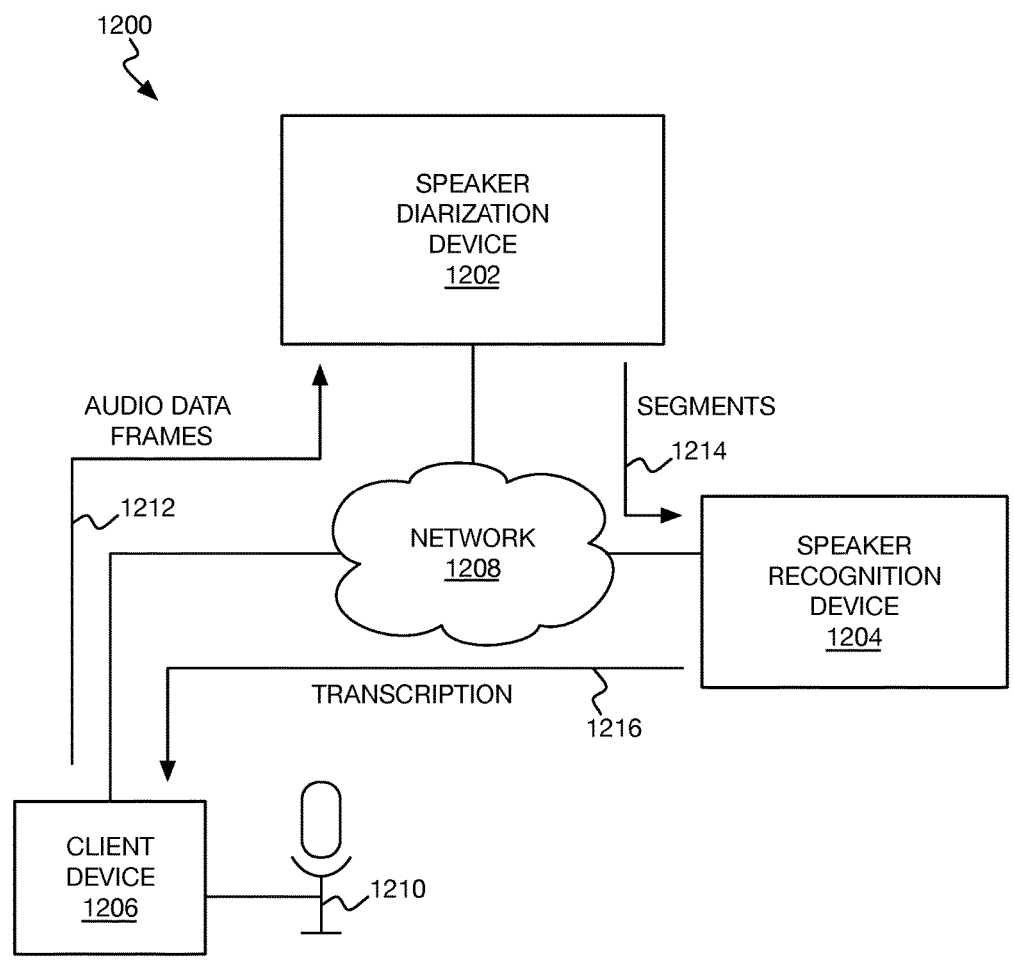
FIG. 12 is a diagram of an example computing system for performing automatic speech recognition in which speaker diarization using an LSTM RNN occurs.

FIG. 12 shows an example system 1200 in which speech recognition can be performed after speaker diarization. The system 1200 includes a speaker diarization computing device 1202, a speech recognition computing device 1204, and a client computing device 1206 that are communicatively connected to one another over a network 1208. The network 1208 may be or include a local-area network (LAN), a wide-area network (WAN), an intranet, an extranet, the Internet, as well as other types of networks. Each computing device 1202, 1204, and 1206 may be a general-purpose computer. For instance, the computing devices 1202 and 1204 may be server computing devices, whereas the client computing device 1206 may be a server computing device, a desktop or laptop computer, and/or a mobile computing device, such as a smartphone, a tablet computing device, and so on.

The client computing device 1206 includes or is connected to a microphone 1210 that records audio data, such as in real-time. Therefore, the client computing device 1206 digitizes the audio data and sends audio data frames 1212 to the speaker diarization device 1202. The audio data frames 1212 may be sent as the audio data is recorded and digitized. The speaker diarization computing device 1202 performs speaker diarization on the audio data frames 1212 using an LSTM RNN, and sends the identified labeled segments 1214 to the speech recognition computing device 1204. The segments 1214 may be sent as they are identified from the frames 1212. The speech recognition computing device 1204 performs speech recognition on the labeled segments 1214, and sends the text transcription 1216 thereof back to the client computing device 1206 for usage.

For example, the client computing device 1206 may use the speech recognition results (i.e., the text transcription 1216) as input by which the client computing device 1206, or a different device connected to the client computing device 1206, is controlled. That is, different physical actions can be performed or can be caused to be performed by the client computing device 1206 according to the speech recognition results. In such instance, then, the speech recognition is used to control a physical device, be it the client computing device 1206 or another device.

The topology of the system 1200 illustrates a distributed implementation in which speaker diarization occurs separately from speech recognition, including concurrently or simultaneously therewith. Therefore, performance is improved because one segment of the audio data can be transcribed by the speech recognition computing device 1204 while the speaker diarization computing device 1202 is identifying the next segment of the audio data. Accuracy of the speech recognition is improved via the usage of an LSTM RNN in performing the speaker diarization. The speaker diarization and speech recognition processes, however, can be performed at the same computing device. Speaker diarization and speech recognition can be performed concurrently with one another, as described, or speech recognition can be performed after speaker diarization has been completed, as to the audio data as a whole.

Figure 13:
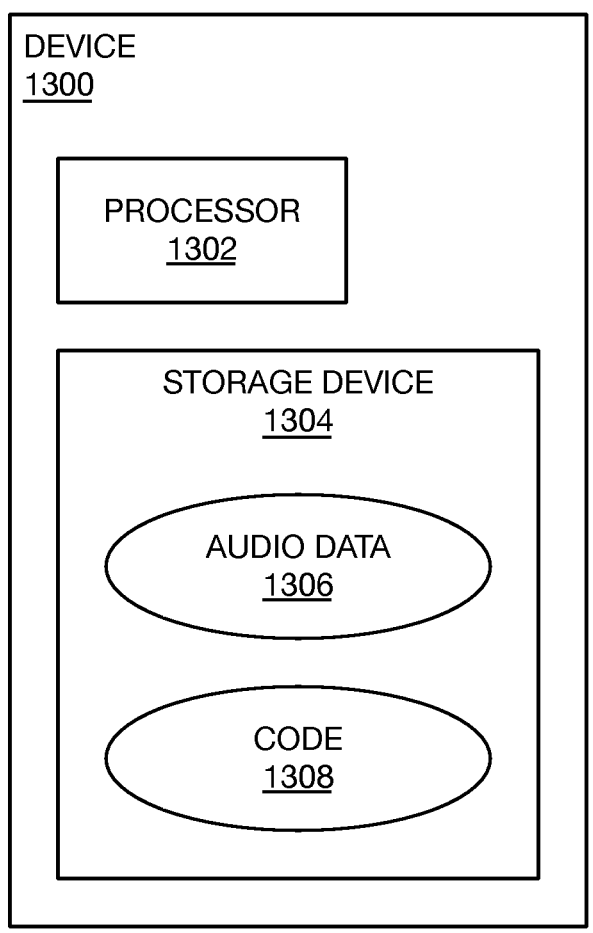
FIG. 13 is a diagram of an example computing device that can implement any of the devices of the computing system of FIG. 12.

FIG. 13 shows an example computing device 1300 that can implement any of the computing devices 1202, 1204, and 1206. The computing device includes a processor 1302 and a storage device 1304. The storage device 1304 stores audio data 1306 and computer-executable code 1308. The processor 1302 can execute the code 1308 to perform speaker diarization and/or speech recognition in relation to the audio data 1306, as has been described above.

The techniques that have been described herein provide for a technical improvement in speech recognition technology via the identification and labeling of audio data segments corresponding to different speakers. Accurate identification of the audio data segments ensures that non-speech audio data, such as silence or music, does not undergo speech recognition and thus prevents erroneous speech recognition from occurring. Labeling of the audio data segments by speaker further permits speech recognition to be tailored on a per-speaker basis, so that different characteristics unique to one speaker do not influence speech recognition of another speaker's speech.

Furthermore, the techniques that have been described herein as to audio data segmentation (including segment labeling) can be employed for audio data processing other than speech recognition. Examples of such other audio data processing include emotion recognition, speaker identification, role modeling, and speech enhancement. Emotion recognition is the mapping of different segments to emotional states conveyed by the speech of those segments, such as anger, happiness, concern, and so on. Speaker identification is the mapping of different segments to their speakers, without regards to the recognition of the speech of the segments. Role recognition is the mapping of different segments to roles taken on by speakers within a spoken interaction, where different speakers may take on different roles over the course of the audio data, and multiple speakers may assume the same role. Speech enhancement is processing on the underlying audio data of the segments so that they are more clearly understood by human and machine listeners.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A computing system comprising:
   a processor;
   a storage device to store audio data including speech of a first speaker type, speech of a second speaker type, and silence, the storage device storing computer-executable code that the processor is to execute to:
   segment the audio data using a long short-term memory (LSTM) recurrent neural network (RNN) to identify a plurality of change points of the audio data that divide the audio data into a plurality of segments, each change point being a transition from one of the first speaker type, the second speaker type, and the silence to a different one of the first speaker type, the second speaker type, and the silence; and perform speech recognition on the segments, wherein segmentation of the audio data using the LSTM RNN to identify the change points technically improves speech recognition technology, by improving accuracy of the speech recognition on the segments when the audio data includes one or more of speech articulated by multiple speakers, silence, and music.

2. The computing system of claim 1, wherein the processor is to execute the computer executable code to further:

assign a label selected from a group of labels to each segment of the audio data using the LSTM RNN, the group of labels comprising labels corresponding to the first speaker type, the second speaker type, and the silence.

3. The computing system of claim 2, wherein the processor assigns the label to each segment of the audio data concurrently with identification of the change points of the audio data while segmenting the audio data using the LSTM RNN.

4. The computing system of claim 2, wherein the audio data further includes music, and the group of labels further comprises a label corresponding to the music.

5. The computing system of claim 1, wherein the audio data comprises a plurality of frames, and wherein the processor is to segment the audio data by:

while sequentially proceeding through the frames of the audio data, assigning a label selected from a group of labels to each frame of the audio data using the LSTM RNN, the group of labels comprising labels corresponding to the first speaker type, the second speaker type, and the silence;

in response to assigning the label to a current frame of the audio data that is different than the label assigned to a preceding frame of the audio data, identifying a current change point.

6. The computing system of claim 5, wherein the processor is to segment the audio data by further:

in response to assigning the label to the current frame that is different than the label assigned to the preceding frame, demarcating an end of a preceding segment of the audio data at the current change point, the preceding segment having a start that a preceding change point demarcates.

7. The computing system of claim 5, wherein the audio data further includes music, and the group of labels further comprises a label corresponding to the music.

8. The computing system of claim 1, wherein speech recognition is performed on the segments that each correspond to one of the first speaker type and the second speaker type.

9. The computing system of claim 8, wherein the processor is to execute the computer-executable code to further:

cluster the segments into a plurality of clusters corresponding to the first speaker type, the second speaker type, and the silence, wherein the processor is to perform the speech recognition on the segments using a speaker-adapted (SA) speech recognition system that takes into account the clusters into which the segments have been clustered.

10. The computing system of claim 8, wherein the processor is to perform the speech recognition on the segments using a speaker-independent (SI) speech recognition system, as the audio data is divided into the segments.

11. A computer program product comprising a computer-readable storage medium having program instructions embodied therewith, wherein the computer-readable storage medium is not a transitory signal per se, the program instructions executed by a computing device to:

apply a long short-term memory (LSTM) recurrent neural network (RNN) model to audio data including speech by a first speaker, speech by a second speaker, and silence, application of the LSTM RNN model to the audio data segmenting the audio data into a plurality of segments, each segment corresponding to one of the first speaker, the second speaker, and the silence; and perform speech recognition on the segments that each correspond to one of the first speaker and the second speaker, wherein segmentation of the audio data using the LSTM RNN to identify the change points technically improves speech recognition technology, by improving accuracy of the speech recognition on the segments when the audio data includes one or more of speech articulated by multiple speakers, silence, and music.

12. The computer program product of claim 11, wherein the application of the LSTM RNN model to the audio data assigns a label selected from a group of labels to each segment of the audio data, the group of labels corresponding to the first speaker, the second speaker, and the silence.

13. The computer program product of claim 12, wherein the application of the LSTM RNN model to the audio data concurrently segments the audio data into the audio data and assigns the label to each segment.

14. The computer program product of claim 12, wherein the audio data further includes music, and the group of labels further comprises a label corresponding to the music.

15. The computer program product of claim 11, wherein the program instructions are executed by the computing device to further:

cluster the segments into a plurality of clusters corresponding to the first speaker, the second speaker, and the silence, wherein performance of the speech recognition on the segments employs a speaker-adapted (SA) speech recognition system that takes into account the clusters into which the segments have been clustered.

16. The computer program product of claim 11, wherein performance of the speech recognition on the segments employs a speaker-independent (SI) speech recognition system, as the audio data is segmented into the segments.

17. A method comprising:

receiving, by a computing device, a plurality of frames of audio data as the frames are generated, the audio data including speech by a first speaker, speech by a second speaker, and silence;

as the frames are received, assigning, by the computing device, labels to the frames from a group of labels using a long short-term memory (LSTM) recurrent neural network (RNN), the group of labels comprising labels corresponding to the first speaker, the second speaker, and the silence;

as the labels are assigned to the frames, grouping, by the computing device, the frames into sequential segments demarcated by transitions in the audio data from one of the first speaker, the second speaker, and the silence to a different one of the first speaker, the second speaker, and the silence;

as the frames are grouped into the sequential segments, performing, by the computing device, speech recognition on the sequential segments that each correspond to one of the first speaker and the second speaker, wherein segmentation of the audio data using the LSTM RNN to identify the change points technically improves speech recognition technology, by improving accuracy of the speech recognition on the segments when the audio data includes one or more of speech articulated by multiple speakers, silence, and music.

18. The method of claim 17, wherein grouping the frames in the sequential segments comprises:
   in response to determining that the label assigned to a current frame differs from the label assigned to a preceding adjacent frame, ending a current segment at the preceding adjacent frame and starting a new segment at the current frame; and
   in response to determining that the label assigned to the current frame is identical to the label assigned to the preceding adjacent frame, adding the current frame to the current segment.

19. The method of claim 18, wherein performing the speech recognition on the sequential segments that each correspond to one of the first speaker and the second speaker, as the frames are grouped into the sequential segments, comprises:
   after the current segment has been ended, performing the speech recognition on the current segment if the label of the frames of the current segment corresponds to one of the first speaker and the second speaker, without waiting for the new segment to end.

20. The method of claim 17, wherein the audio data further includes music, and the group of labels further comprises a label corresponding to the music.

\* \* \* \* \*